Dec. 15, 1925.

W. H. COTTON

STEAM ENGINE

Filed April 16, 1920 — 2 Sheets-Sheet 1

1,566,075

Inventor:
Walter H. Cotton
By
Atty's.

Dec. 15, 1925.

W. H. COTTON

STEAM ENGINE

Filed April 16, 1920    2 Sheets-Sheet 2

1,566,075

Inventor:
Walter H. Cotton
By Tilleson & Tilleson
Attys.

Patented Dec. 15, 1925.                                                                      1,566,075

UNITED STATES PATENT OFFICE.

WALTER H. COTTON, OF CHICAGO, ILLINOIS, ASSIGNOR TO LOCOMOTIVE STOKER COMPANY, A CORPORATION OF PENNSYLVANIA.

STEAM ENGINE.

Application filed April 16, 1920. Serial No. 374,445.

*To all whom it may concern:*

Be it known that I, WALTER H. COTTON, a citizen of the United States, and resident of Chicago, county of Cook and State of Illinois, have invented certain new and useful Improvements in Steam Engines, of which the following is a specification, and which are illustrated in the accompanying drawings, forming a part thereof.

The invention relates to that type of steam engines in which there is provided an oscillating piston working within a drum-shaped cylinder, its objects being to secure simplicity of construction, reliability and efficiency.

The invention consists in a structure such as is hereinafter described and illustrated in the accompanying drawings, in which—

Figures 1, 2:
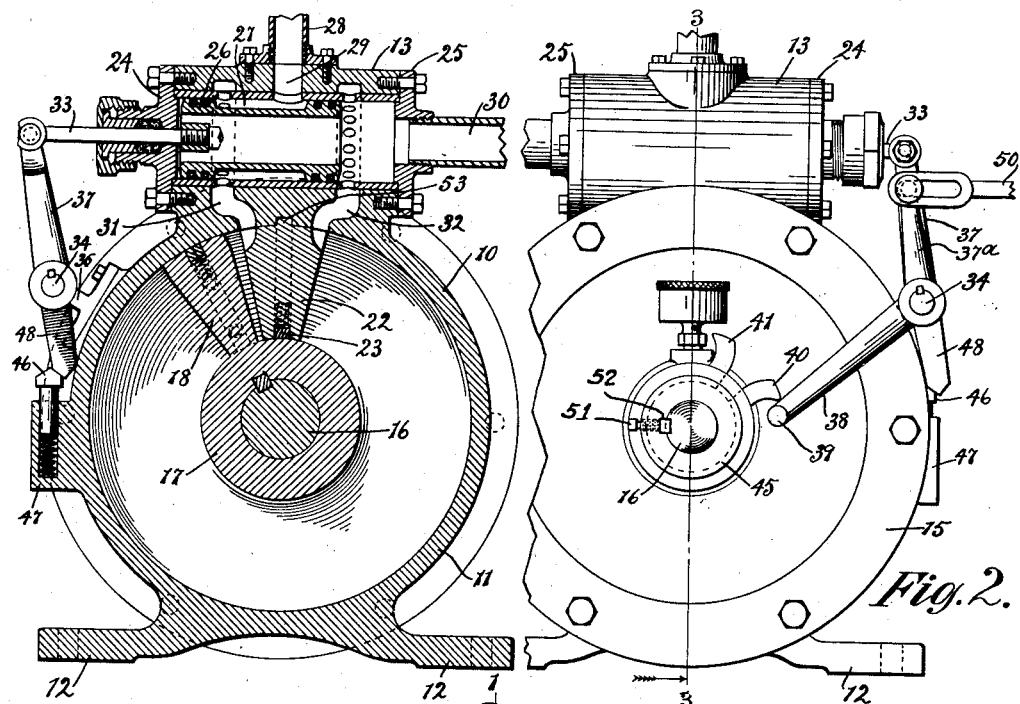
Fig. 1 is a sectional view taken on the line 1—1 of Fig. 3.
Fig. 2 is an end elevation of the invention.

The engine cylinder is in the form of a drum, generally designated by the numeral 10, and comprises a cylindrical shell 11 which may be provided with supporting feet, as 12, and upon which may be cast integrally the casing 13 of the distributing valve, and heads 14, 15, which are securely bolted to the cylindrical body 11, the engine shaft 16 being journaled in these heads on the axis of the cylindrical shell.

Figure 7:
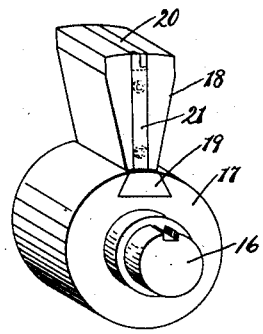
Fig. 7 is a detail of the engine piston, mounted upon the shaft.

A sleeve 17 is keyed upon the shaft within the cylinder, fitting snugly within recesses formed in the inner faces of the heads 14, 15. Upon this sleeve is formed (as in Fig. 1), or to it is secured (as in Fig. 7) a piston head 18, the attachment of the piston to the sleeve 17 being preferably by means of a dove-tail extension 19 of the piston fitting within a complementary longitudinal recess in the sleeve, as shown in Fig. 7. The piston 18 snugly but slidably engages the internal circumferential and end faces of the cylinder, and steam-tight joints are secured by the use of suitable spring-advanced packing strips 20, 21, seated within complementary channels in the end and side faces of the piston.

A header or fixed abutment 22 is fitted within the cylinder, being seated within channels in the inner faces of the heads 14, 15, and having a rib 53 entering a channel in the cylinder wall, and extends from the inner face of the cylinder shell 11 to the sleeve 17 which it slidingly engages, a steam-tight joint being secured by the use of a spring-advanced packing strip 23.

One of the features of the invention consists in the manner in which the header or abutment 22 is secured in place. The parts are readily assembled by sliding the header or abutment 22 into the cylinder after one of the heads 14, 15, has been placed and the shaft 16 inserted.

The valve casing 13 is longitudinally bored, its axis being transverse to that of the engine cylinder. The ends of this casing are closed by suitable heads 24, 25, and within it there reciprocates a tubular trunk valve 26 having a circumferential channel or cavity 27. Steam is led to the valve casing through a pipe 28, connecting with a lateral port 29, which is at all times in communication with the valve cavity 27. An exhaust pipe 30 leads from a port in the head 25. A pair of ports 31, 32, lead laterally from the bore of the valve casing to the chamber of the cylinder, entering the latter respectively at opposite sides of the abutment 22, and being so spaced apart that they may be simultaneously covered by the end portions of the valve 26, and may be alternatively respectively opened to circumferential valve cavity and to the chamber of the valve casing, whereby such ports in alternation supply and exhaust steam to and from the engine cylinder.

Figure 3:
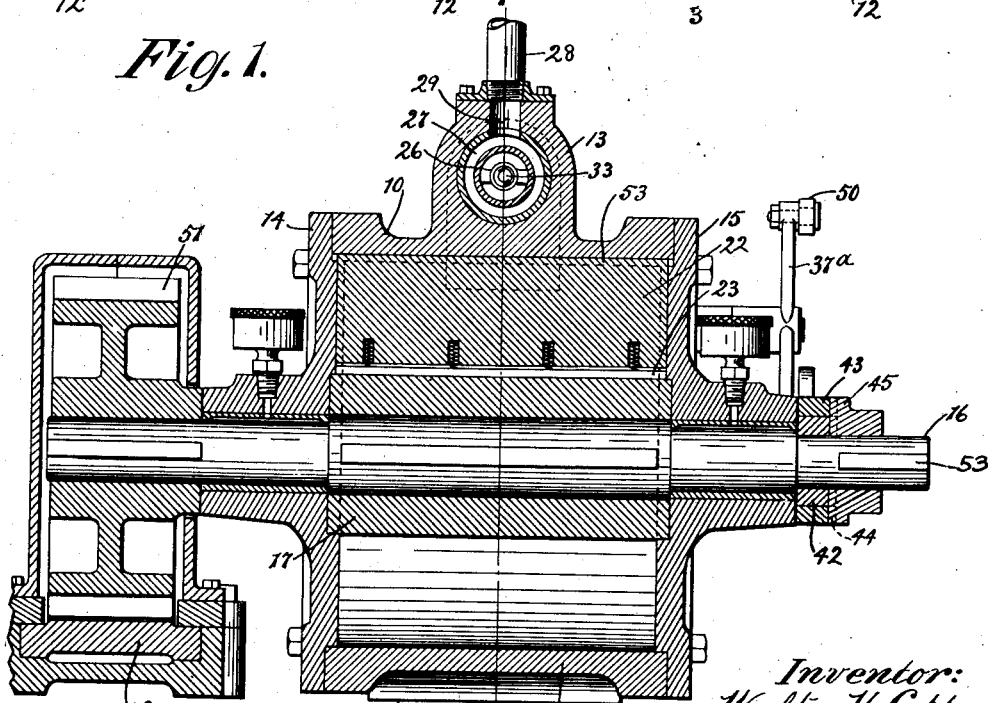
Fig. 3 is a sectional view taken on the line 3—3 of Fig. 2.

The valve 26 is provided with a stem 33, projecting through the head 24, which is provided with a suitable stuffing box to insure a steam-tight joint. A shaft 34, journaled in the box 35, carried by the bracket 36 secured to the engine cylinder, is provided with a crank-arm 37 connected to the stem 33, and with the crank-arm 38 having at its end a lateral finger 39 which projects into the path of a pair of tappets 40, 41, carried by the shaft 16 at the outer side of one of the end walls, as 15, of the cylinder. These tappets are shown as being in the form of fingers, each projecting from a ring, as 42, 43, encircling the shaft 16 and being circumferentially adjustable. As shown, these rings are sleeved the one upon the other, the outer one being cut away through a portion of its circumference as at 60, see Fig. 5, to accommodate and permit the movement of the tappet 41 of the smaller ring. The rings, as 42, 43, are provided with a series of concentric teeth 44, which cooperate with complementary teeth 440 on a clutch member 45 splined upon the shaft 16 and held in position by any suitable means such as a set screw 51, see Figs. 2 and 4, carried by the member 45 and adapted to engage the shaft 16. When it is desired to adjust the tappets 40 and 41 relatively to the shaft 16 or to each other the set-screw 51 is released, the clutch member 45 slid outwardly along the shaft 16 and spline 53 until its teeth disengage the concentric teeth 44 of the rings 42 and 43, after which the rings 42 or 43 or both are angularly adjusted and the clutch member moved inwardly until its teeth again engage the teeth 44 on both rings 42 and 43 as shown in Fig. 3, after which the set-screw is turned into engagement with the shaft 16 for holding the clutch member 45 in position thereon.

Figure 4:
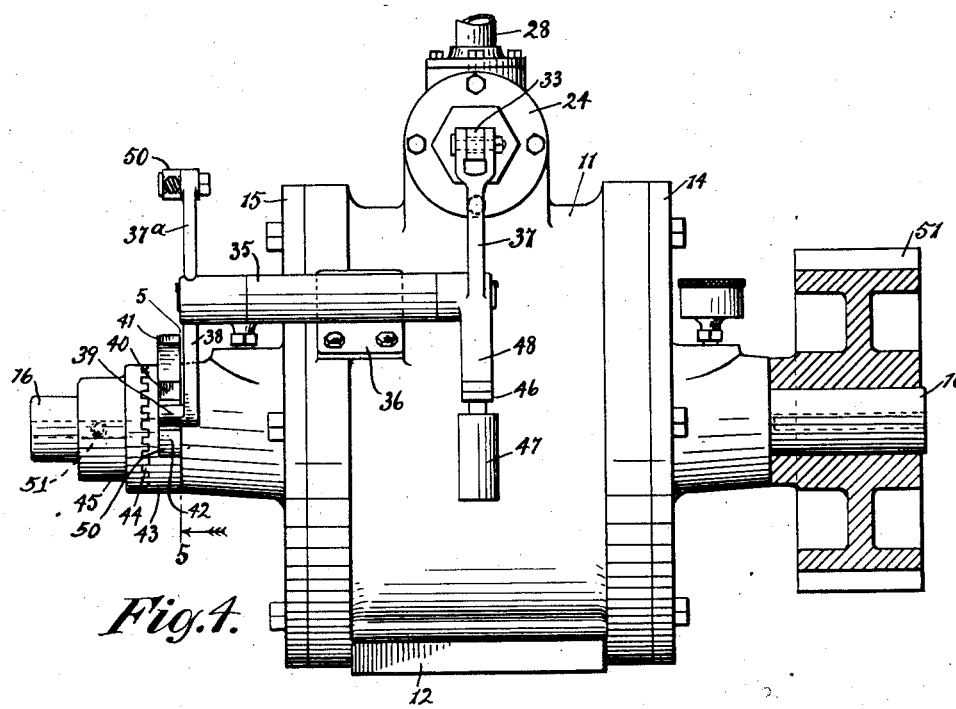
Fig. 4 is a side elevation of the engine, some parts being shown in section.
Figure 5:
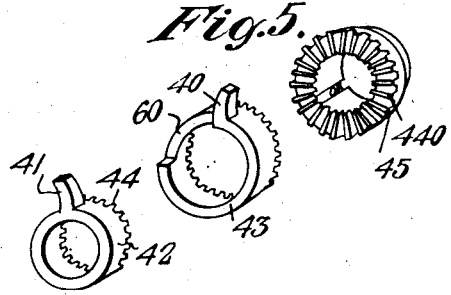
Fig. 5 is a perspective view of the clutch mechanism showing the same in disassembled position.

As the engine piston reaches the desired limit of its outstroke in either direction, one of the tappets, as 40, 41, makes contact with the finger 39 and shifts the valve to its opposite position, a suitable spring device being provided for automatically insuring a complete stroke of the valve. By shifting the position of either or both of the tappets the stroke of the engine may be varied in length, and may be caused to extend through any portion of the possible movement of the piston. As illustrated in Figs. 1 and 4, this valve-shifting spring device comprises a spring-advanced plunger 46, seated in a pocket formed in the boss 47 cast upon the cylindrical wall of the engine casing, the head of the plunger being V-shaped. An arm 48, fixed upon the shaft 34 and having a V-shaped end, cooperates with the end of the plunger. The shifting of the arm 38 by its contact with one of the tappets 40, 41, carries the apex of the end of the arm 48 past the apex of the plunger, compressing the spring upon which it is seated, whereupon by cam action under the influence of the spring the arm 48 is thrown still farther in the same direction, with the result that the valve is carried to the proper position for reversing the direction of the engine piston.

Figure 6:
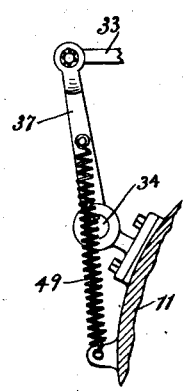
Fig. 6 is a detail of a modified form of valve shifting mechanism.

In the modification of Fig. 6, in lieu of the plunger 46 and arm 48, there is employed a tension spring 49, anchored to a lug formed upon the engine cylinder and connected with the arm 37 above the shaft 34. The shifting of the arm 37 by contact with one of the tappets will carry the arm 37 a sufficient distance to shift the end of the spring attached to it past the center of the shaft 34, whereupon, by its contraction, the spring will complete the desired movement of the valve.

At 50 there is shown a rod connected with the arm 37ª for manually shifting the valve. This manual control may be used in situations where it is desirable that the engine position should have but a single stroke.

The engine shaft may be connected up in any desirable manner for driving purposes. At 51 there is shown a gear wheel keyed upon the shaft and cooperating with the rack bar 52, successive strokes of the engine piston causing the reciprocation of such bar.

While an operative and desirable form of construction is shown and described, the invention may be differently embodied without departing from its scope.

I claim as my invention:

1. In a fluid driven motor, in combination, a cylinder, a shaft on the axis of the cylinder, a piston carried by the shaft, a fixed abutment extending from the cylinder walls to the shaft, a valve for directing the driving fluid alternately to opposite sides of the piston, a rock shaft for actuating the valve and having a crank arm, a pair of tappets carried by the first-named shaft and circumferentially adjustable thereupon, such tappets being positioned to engage and move the crank arm.

2. A fluid driven motor comprising, in combination, a cylindrical casing, heads closing the ends of said casing, a piston shaft journaled in said heads, an oscillating piston carried by said shaft, a fixed abutment in said casing, a valve casing having an admission port opening on each side of said abutment, and also having inlet and exhaust ports, a reciprocating valve in said casing controlling said ports, a crank shaft journaled upon said cylindrical casing, a crank arm on said crank shaft adapted to reciprocate said valve, a second crank arm on said shaft, and means on said piston shaft for alternately actuating said second crank arm in opposite directions, said means comprising interlocking disks having fingers projecting therefrom, said fingers being adjustable as to circumferential separation.

3. In a fluid-driven motor, the combination of a cylinder, an oscillating piston therein, a valve for directing the driving fluid alternately to opposite sides of the piston, a movable element for shifting the valve, an oscillating shaft actuated by the piston, a pair of rings circumferentially adjustable upon the shaft, a tappet carried by each ring for moving the valve-shifting element, and means for securing the rings in adjusted positions.

WALTER H. COTTON.